United States Patent [19]
Norcross

[11] 3,788,108
[45] Jan. 29, 1974

[54] LOCK FOR WHEELED VEHICLE

[76] Inventor: Sterling E. Norcross, 19 Osborne St., Bloomfield, N.J. 07003

[22] Filed: July 25, 1972

[21] Appl. No.: 274,861

[52] U.S. Cl.................................... 70/233, 70/196
[51] Int. Cl............................................... B62h 5/06
[58] Field of Search ............. 70/184, 185, 186, 233

[56] References Cited
UNITED STATES PATENTS
2,625,813   1/1953   Hinds................................... 70/185
FOREIGN PATENTS OR APPLICATIONS
293,044   2/1932   Italy..................................... 70/233

*Primary Examiner*—Albert G. Craig, Jr.
*Attorney, Agent, or Firm*—Daniel H. Bobis

[57] ABSTRACT

A device for holding at least one wheel assembly on a vehicle transverse to the longitudinal line of the frame of the vehicle has a support means connected to the frame on which is pivotly mounted an elongated locking bar movable from a disengaged position to a position of engagement with the wheel assembly. A locking assembly spaced from the pivotable connection of the locking bar includes, latching means to releasably hold the locking bar in the engaged position until the latching means is released. The latching means is operatively associated with a lock means for releasing the locking bar from the engaged position.

7 Claims, 6 Drawing Figures

PATENTED JAN 29 1974 3,788,108
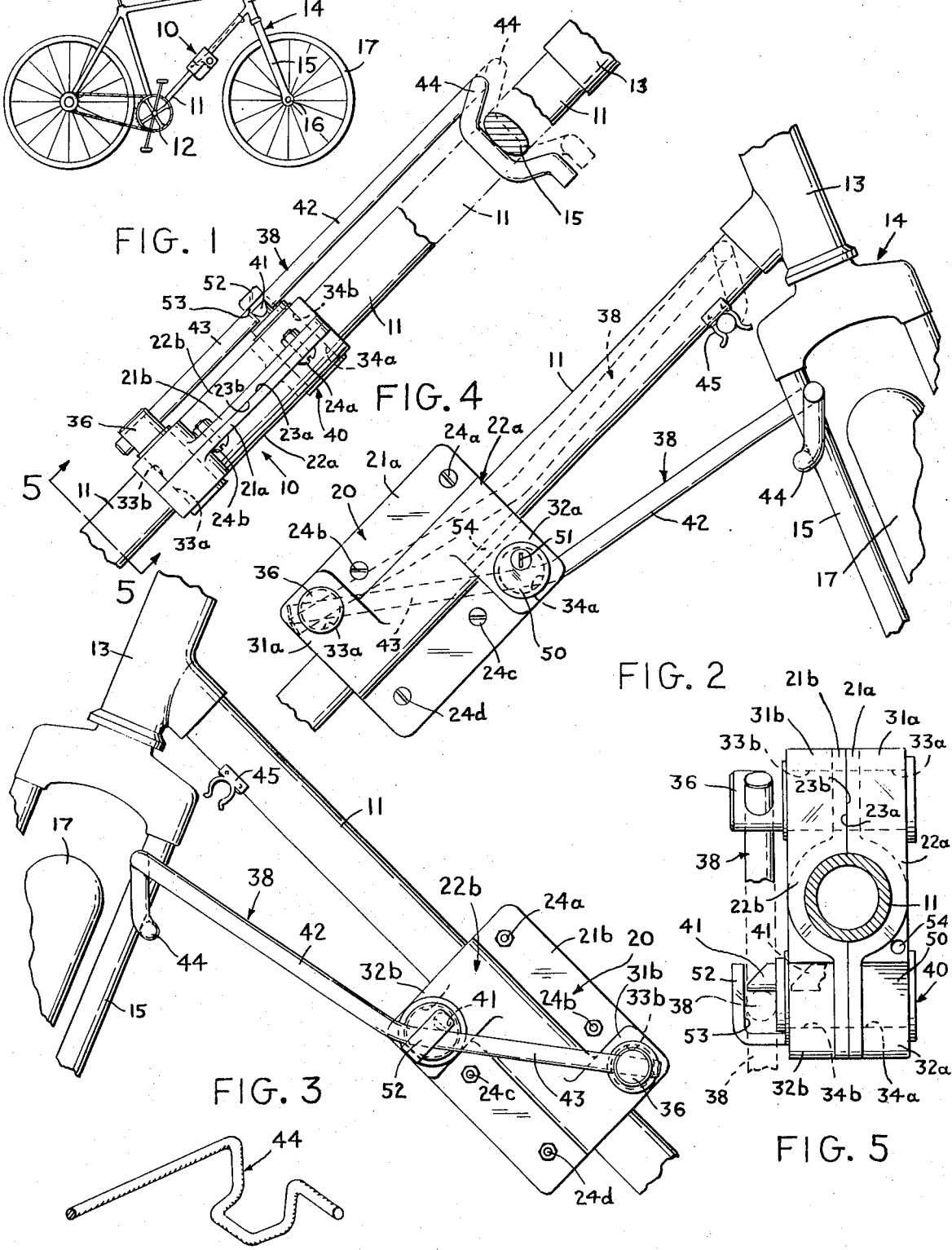

LOCK FOR WHEELED VEHICLE

BACKGROUND OF THE INVENTION

The proliferation of wheeled vehicles particularly bicycles and motorcycles has occurred because of the tremendous increase in the demand for low cost transportation until at the present time the demand for bicycles and motorcycles has produced a short supply and high prices. As a result of these conditions, a lucrative market for stolen bikes and motorcycles has added to the normal high theft rate of these portable vehicles.

Further, there is no readily available locking devices of the type which are permanently attached to the bicycle or motorcycle. People are still utilizing the antiquated frustrating method of chaining their bicycles and motorcycles to posts, trees, etc. if any effort is made at all to prevent the theft of these vehicles.

It is primarily because of this vast unlocked storehouse of bicycles and motorcycles, left in accessible places, that theft is invited and this coupled with the lucrative market for such stolen bicycles represents the major reason why the incidence of stolen bicycles and motorcycles remains high.

The prior art shows various efforts have been made to create vehicle locks for bicycles and motorcycles as is indicated in U.S. Pat. Nos. 533,755; 2,163,853; 2,055,149; 491,335 and 2,625,813.

SUMMARY OF THE INVENTION

The present invention consists principally of a locking device designed to hold at least one wheel assembly in a position transverse to the frame of a wheeled vehicle and consists of a support which may be affixed permanently or clamped to the frame on which is pivotally connected an elongated locking bar designed to remain in alignment with the frame of the vehicle in the disengaged position and to pivot to a locking position when it engages the wheel assembly of the wheeled vehicle when disposed in the transverse position, and the means are provided to latch and lock the elongated bar in the engaged position which bar cannot be disengaged unless it is unlocked as by a key or other suitable control means.

Other features and advantages of the present invention will be apparent from the following description when taken in connection with the accompanying drawings in which:

FIG. 1 is a diagrammatic illustration of a bicycle in side elevational showing a locking device in accordance with the present invention mounted thereon.

FIG. 2 is a right side elevational view of a fragment of the bicycle shown in FIG. 1 showing the locking device in accordance with the present invention engaging the wheel in the transverse position to the longitudinal line of the frame of the bike with the elongated locking bar of the locking device shown in dotted position in the disengaged position.

FIG. 3 is a left side elevational view of the same fragment of the bicycle with the locking device thereon as shown in FIG. 2.

FIG. 4 is a top view of FIG. 2 with the lower frame bar partly broken away to show the elongated locking bar in the locked or engaged position.

FIG. 5 is a rear view of the locking device shown in FIG. 2 of the drawings taken on line 5—5 of FIG. 4.

FIG. 6 is a perspective view of the front end of the elongated locking bar.

Referring to the drawings, a conventional bicycle is illustrated diagrammatically in FIG. 1 with a locking device in accordance with the present invention generally designated 10 mounted thereon. It will be understood that while the invention is illustrated as applied to bicycles that it is not intended to so limit the present invention and that the invention is applicable to other vehicles or fields of use as will be readily apparent to those skilled in the art when the principles thereof are understood as hereinafter described.

Thus, referring to the drawings, FIG. 1 shows that the bicycle has a lower frame support 11 which is connected between the sprocket 12 and the yoke 13 which contains bearing means for rotatably supporting the wheel assembly 14. The fork 15 of the wheel assembly 14 has an axle 16 for rotatably mounting the wheel 17.

The wheel assembly 14 can be rotated in the yoke 13 so that the wheel 17 is in alignment with the frame or can be turned at an angle normal to the longitudinal line of the frame as is indicated in FIGS. 2 and 3 of the drawings.

LOCKING DEVICE

By reference to FIGS. 2, 3, 4, and 5 of the drawings, the locking device 10 in accordance with the present invention is shown to consist of a support member generally designated 20 which consists of two complimentary body parts as at 21a and 21b. These body members 21a and 21b are constructed to form a clamp means in that they have a formed central portions 22a and 22b the respective halfs to fit snugly about the lower frame support 11 so that the respective flat portions thereof as at 23a and 23b can be held snugly together as by threaded members at 24a, 24b, 24c and 24d.

It is readily apparent that if the respective half 21a and 22b are identical in construction that they will be adapted for easier assembly even by unskilled people who desire to attach locking devices in accordance with the present invention to the frames of their bicycles.

The body members 21a and 21b are provided with spaced bosses as at 31a and 32a on body member 21a and 31b and 32b on body member 21b. The bosses are each provided with bores therethrough as at 33a in boss 31a, 34a in boss 32a and similarly 33b in boss 31b and 34b in boss 32b.

When the respective half members 21a and 21b are mounted on the support 11, the bosses and their respective openings will be brought into alignment with each other to permit the aligned openings 33a and 33b to rotatably receive a pivot shaft 36 which extends beyond the boss 31b on body member 21b as is readily shown in FIGS. 4 and 5 of the drawings. The extended end of the shaft 36 will be fixedly connected to one end of the elongated locking bar 38 to pivotally mount the same for movement from a disengaged position as shown by the dotted lines in FIG. 2, to an engaged position as shown by the full lines in FIG. 2.

Similarly, the aligned openings 34a and 34b which are spaced and offset from the elongated openings 33a and 33b receive a locking assembly generally designated 40 which includes a latching means 41 disposed to coact with the elongated locking bar 38 all of which is shown in FIGS. 4 and 5 of the drawings and more fully described hereinafter.

The elongated locking bar 38 has a straight portion 42 and and angled portion 43 connected to the straight portion 42. The angled portion 42 is fixedly connected to the pivot shaft 36 and rotatable therewith so that the elongated locking bar can be easily moved from the disengaged or unlocked position as shown by the dotted or phantomized lines in the figures of the drawings to the engaged or locked position as shown by the full lines in these figures.

By reference to FIGS. 3, 4 and 5 it will be noted that by reason of the extension of the pivot shaft 36 beyond the boss 31b of body member 21b, the elongated locking bar 38 can rotate through a plane parallel to and spaced from the plane of the frame support 11.

Further, the free end of the elongated locking bar is provided with an L-shaped engagement means 44 which projects towards the frame support 11 and is contoured to fit about the frame support so that in the disengaged positions as shown by the dotted or phantomized line in FIG. 2 the elongated locking bar 38 can be held by a suitable spring clamp 45 which will hold the elongated locking bar 38 yet permit the ready release thereof when it is desired to move the same to the engaged or locked position with the wheel assembly as shown by the solid lines of FIGS. 2 and 3 of the drawings.

When the elongated locking bar 36 is released from the spring clamp 45 and moved to the engaged or locked position it will releasably engage the latching means 41 of the locking assembly 40 now to be described.

LOCKING ASSEMBLY

The locking assembly 40 will include the conventional locking tumblers diagrammatically illustrated at 50 operated by a key (not shown) which fits into the key slot 51 of the locking tumblers.

The locking tumblers coact with suitable means for locking the latching means 41 from inward sliding movement against the conventional spring loaded means similar to that used in door latches and the like devices.

The latching means or member 41 extends transverse to the plane of movement of the elongated locking bar 38 and coacts with an L-shaped strike plate 52 so that it defines a locking bar space 53 into which the angled section 43 will fit when the elongated locking bar 38 is moved to the engaged position as is shown in FIGS. 2, 4 and 5 of the drawings.

It will be noted that the angled section 43 of the elongated lcoking bar 36 has a length sufficient to permit the desired engagement with the latching means 41 and strike plate 52 and that the connection of the angled portion 43 with the straight portion 42 occurs beyond this point of engagement.

A cable bore or slot 54 is provided in the boss 32a of body part 21a as shown in FIGS. 4 and 5 to receive therethrough a brake cable (not shown) or other control cable. It will be understood that additional cable bores or slots can be provided as may be required for the particular vehicle.

OPERATION

The locking device 10 is assembled to the frame as has been above described and the key inserted to permit the elongated locking bar 38 to be released and moved to the unlocked or disengaged position as shown by the dotted lines where it will be held by the spring clamp 45 until it is desired to lock the bicycle.

To lock or move the elongated locking bar 38 to the engaged position the wheel assembly 14 is first turned so that it is normal or transverse to the longitudinal line of the frame of the bicycle. Then the elongated locking bar 38 is released from the spring clamp 45 and moved so that the L-shaped engagement means 44 will snugly engage the fork 15 of the wheel assembly 14 and the angled section 43 will simultaneously pass the latching means 41 so that it lies in the locking bar space 53 between the latching means 41 and the strike plate 52.

In order to release the locking bar, the key must be inserted into the key slot to unlock the lock tumblers. When this is done, the locking bar can be returned to the unlocked or disengaged position. A combination lock may also be used.

Thus, a simple locking device for a wheeled vehicle has been described which can be instantly activated. The locking device may be painted a bright color so that it also serves as a visual signal to alert public authorities to check bike ownership when the bicycle is being moved or pushed in the locked position.

The locking device of the present invention is sturdy, compact and cannot be easily destroyed. It can be factory installed or supplied as an over the counter accessory by bicycle shops, sporting goods stores, etc.

It can be made or adjusted to any standard bicycle frames and mounted to both straight and curved frame support members.

The locking device in accordance with the present invention is always available and can be readily and quickly applied by the owner, without a key, yet cannot be unlocked or released except by unlocking the lock tumblers which coact with the latching means for the elongated locking bar.

Although a preferred embodiment of the present invention has been shown and described herein, it will be understood that the invention is not to be limited thereto, for it is susceptible of changes in form and detail within the scope of the following claims.

What is claimed is:

1. The combination with a vehicle having a frame, and at least one rotatable wheel assembly mounted therein of, means for locking the wheel assembly in a position transverse to the longitudinal line of the vehicle including:

a. support means connected to said frame, b. an elongated locking bar means includes, an angled section pivotally connected at one end to the support means, and a straight section connected to the angled section at a point remote from the point of pivotal connection, c. means for normally holding the locking bar in the disengaged position, d. means on the locking bar means remote from the pivoted end disposed to engage the wheel assembly when the locking bar is moved for locking engagement with the wheel assembly, e. locking means including latching means, operatively associated with the locking bar for releasably latching and for locking the locking bar in the engaged position, and f. the locking means is on the support means and is spaced from the pivotal connection of the locking bar to permit the latching means to engage the elongated locking bar when the elongated locking bar is moved to the engaged position.

2. In the combination as claimed in claim 2 wherein, a. the locking means is on the support means and is spaced vertically and horizontally from the point of pivotal connection for the elongated locking bar, and b. the locking means is so spaced from the point of pivotal connection as to permit the latching means to engage the angled portion of the elongated locking bar inwardly of the point where the elongated straight portion of the locking bar meets the angled portion.

3. A locking device for a wheeled vehicle comprising;

a. support means, b. said support means adapted to be mounted in the wheeled vehicle, c. means forming a pivot connection on said support means, d. means forming a locking assembly on said support means a predetermined spaced distance from the pivot means and said locking assembly including, latching means, e. an elongated locking bar having one end fixedly connected to the said pivot connection means for pivotal movement thereabout from a disengaged position to an engaged position, f. the elongated locking bar has an angled portion and a straight portion, g. and said locking assembly disposed for releasable latching and locking engagement with the elongated locking bar when the locking bar is moved from the disengaged position to the engaged position, h. and said locking assembly disposed to permit the latch means to engage the angled portion when said elongated locking bar is pivoted to an engaged position.

4. In a locking device for a wheeled vehicle as claimed in claim 3 including, means for holding said elongated locking bar in the disengaged position.

5. In a locking device for a wheeled vehicle as claimed in claim 3 wherein the support means includes, a first body member and a second body member, and means for joining said first body member and said second body member to each other for mounting the support means on the wheeled vehicle.

6. In a locking device for a wheeled vehicle as claimed in claim 5 wherein the respective first body member and second body members are formed to permit the support means to be mounted by clamping action.

7. In a locking device as claimed in claim 3 including, means forming a cable guide on said support means.

* * * * *